(12) United States Patent
Xia

(10) Patent No.: US 8,799,544 B2
(45) Date of Patent: Aug. 5, 2014

(54) SYSTEM ON CHIP AND TRANSMISSION METHOD UNDER AXI BUS

(75) Inventor: Jing Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 487 days.

(21) Appl. No.: 13/079,419

(22) Filed: Apr. 4, 2011

(65) Prior Publication Data

US 2011/0296066 A1 Dec. 1, 2011

(30) Foreign Application Priority Data

May 31, 2010 (CN) .......................... 2010 1 0188560

(51) Int. Cl.
*G06F 13/00* (2006.01)
(52) U.S. Cl.
USPC ........................................................ 710/110
(58) Field of Classification Search
USPC ................................................ 710/110, 317
See application file for complete search history.

(56) References Cited

U.S. PATENT DOCUMENTS

| | | | |
|---|---|---|---|
| 5,430,720 A | 7/1995 | Larsson et al. | |
| 6,578,101 B1 | 6/2003 | Ahern | |
| 8,285,912 B2 * | 10/2012 | Feero et al. | 710/316 |
| 2003/0007457 A1 * | 1/2003 | Farrell et al. | 370/235 |
| 2006/0146811 A1 | 7/2006 | Han et al. | |
| 2008/0215781 A1 * | 9/2008 | Lee et al. | 710/110 |
| 2008/0313365 A1 * | 12/2008 | Bruce | 710/38 |

OTHER PUBLICATIONS

AMBA AXI Protocol—Specification ARM Limited. vol. 1 Copyright © 2003, 2004.
Search Report and Office Action issued in corresponding Great Britain Patent Application No. 1103995.5, mailed Jun. 17, 2011.
SYNOPSYS® DesignWare DW_axi Databook, "DesignWare Synthesizable Components for AMBA 3 AXI", Version 1.06a (Feb. 16, 2007).
AMBA® AXI Protocol Specification, Version 2.0 (2003-2010).

\* cited by examiner

*Primary Examiner* — Paul R Myers
(74) *Attorney, Agent, or Firm* — Brinks Gilson & Lione

(57) ABSTRACT

A system on chip (soc) and A transmission method under Advanced eXtensible Interface (AXI) bus are disclosed. The system includes a master device, a first extending module, a first interconnection structure, a first subtracting module, a second interconnection structure, and a slave device. The first extending module is configured to add N bits into an identifier (ID) carried in a transmission request, where N is equal to a sum of bits added by all interconnection structures in a longest loop of a system into the ID carried in the transmission request that passes through the interconnection structures. The first subtracting module is configured to subtract M bits from the ID carried in the transmission request output by the first interconnection structure when a slave device to be accessed by the master device is not a slave device connected with the first interconnection structure, where M is equal to the number of bits added by the first interconnection structure into the ID carried in the transmission request that passes through the first interconnection structure. The embodiments reduce costs and avoid the problems caused by ID compression.

14 Claims, 13 Drawing Sheets

The first extending module receives a transmission request that carries an identifier (ID) indicating a serial number of a master device and sent by a master device; adds N bits into the ID carried in the transmission request, where N is a positive integer equal to a sum of bits added by all interconnection structures in a longest loop of a system into the ID carried in the transmission request that passes through the interconnection structures; and sends the transmission request that carries the ID added with N bits to a first interconnection structure ⟋ 51

The first subtracting module receives the transmission request output by the first interconnection structure and subtracts n bits from the ID carried in the transmission request output by the first interconnection structure when the slave device to be accessed by the master device is not the slave device connected with the first interconnection structure, where n is a positive integer equal to the number of bits added by the first interconnection structure into the ID carried in the transmission request that passes through the first interconnection structure; and sends the transmission request that carries the ID shortened by n bits to a second interconnection structure to access the slave device ⟋ 52

FIG. 5a

The second extending module adds n bits into an ID carried in a transmission response sent by a second interconnection structure when a slave device intends to access a master device connected with a first interconnection structure, where n is a positive integer equal to the number of bits added by the first interconnection structure into the ID carried in the corresponding transmission request that passes through the first interconnection structure; and sends the transmission response that carries the ID added with n bits to the first interconnection structure ⟶ 61

The second subtracting module subtracts N bits from the ID carried in the transmission response output by the first interconnection structure, where N is a positive integer equal to a sum of bits added by all interconnection structures in a longest loop of a system into the ID carried in the transmission request that passes through the interconnection structures; and sends the transmission response that carries the ID shortened by N bits to the master device ⟶ 62

FIG. 6

SYSTEM ON CHIP AND TRANSMISSION METHOD UNDER AXI BUS

CROSS-REFERENCE TO RELATED APPLICATION

This application claims priority to Chinese Patent Application No. 201010188560.6, filed on May 31, 2010, which is hereby incorporated by reference in its entirety.

FIELD OF THE APPLICATION

The present application relates to network communication technologies, and in particular, to a system on chip (soc) and a transmission method under Advanced eXtensible Interface (AXI) bus.

BACKGROUND OF THE APPLICATION

The AXI bus is a third-generation high-performance system bus developed by ARM Holdings on the basis of an Advanced Peripheral Bus (APB) and an Advanced High-performance Bus (AHB). As shown in FIG. 1, the AXI bus transmission is based on five transmission channels. The AXI bus can transmit five types of packets: read request packet (AR), read data and answer packet (R), write request packet (AW), write data packet (W), and write answer packet (B). The AR, AW, and W packets are transmitted from a master device to a slave device; and the R and B packets are transmitted from a slave device to a master device. A write operation involves one AW packet, several W packets and one B packet; and a read operation involves one AR packet and several R packets. One transmission involves multiple packets which share the same identifier (ID). The packets are scarcely dependent on each other, and no fixed phase relation exists between the packets. Therefore, efficient outstanding transmission is supported, namely, active but outstanding operations may exist on the master device or slave device, and are controlled sequentially through the ID.

The AXI bus supports a point-to-point connection between the master device and the slave device, and can form various sophisticated on-chip bus structures (interconnection structures), for example, a Shared Bus topology or a crossbar topology, to interconnect multiple master devices and multiple slave devices on the chip. Taking the crossbar as an example, a crossbar is also known as a cross-switch matrix or a crossbar switching matrix. When multiple cross-connected nodes are interconnected simultaneously, data can be transmitted between multiple master devices and multiple slave devices simultaneously. In a crossbar, the number of AXI bus signal wires is a product obtained by multiplying three quantities together: the number of signal wires connected to an AXI group, the number of ports of the master device, and the number of ports of the slave device. Generally, the number of signal wires connected to an AXI group is 300, and therefore, in a 3×3 crossbar, there are 2700 AXI buses. When the master devices increase, the signal wires increase noticeably, which leads to difficulty of wiring and consumption of large areas of chips.

To solve such problems, a large crossbar is split into small crossbars, and each small crossbar is designed with interconnection structures to interconnect the master devices and the slave devices. The small crossbars are externally connected in a special mode to implement mutual data access between the crossbars. One of the issues that need to be considered in the special connection mode is the ID. According to the AXI protocol, the AXI data transmission uses the ID to indicate the discrete information distributed on five channels. Therefore, according to the protocol, when multiple master devices access a slave device through the same interconnection structure, an ID needs to be added in the interconnection structure to indicate the serial number of the master device so that the response can be returned by the slave device to the correct master device through the interconnection structure. Consequently, every time the information passes through the crossbar, the bits of the ID transmitted in the AXI bus increase. When a loop is connected to different crossbars, the information width does not match. As shown in FIG. 2, the 4-bit ID of master 0 changes to a 5-bit ID after the information passes through crossbar 0, and changes to a 6-bit ID after the information passes through crossbar 1. The 6-bit ID is not adaptable to the 4-bit interface of crossbar 0, which disrupts the mutual access between the AXI crossbars.

A solution to the problem in the prior art is ID compression: As shown in FIG. 3, an ID compressing module compresses the 6-bit ID output by the loop to make the ID adaptable to the bit width of crossbar 0, thus implementing ID width matching.

Applicants note that the compression process may lead to information loss; different IDs may be compressed into the same IDs for transmission, and the same IDs are transmitted sequentially. As a result, the bus no longer supports non-sequential transmission but supports sequential transmission only, and the efficiency of the bus is lower.

SUMMARY OF THE APPLICATION

Embodiments of the present application provide a system on chip (soc) and a transmission method under AXI bus to avoid bus efficiency decrease caused by the ID information loss when implementing interconnection between multiple interconnection structures.

A system on chip provided in an embodiment includes:

a master device, configured to send a transmission request that carries an ID indicating a serial number of the master device;

a first extending module, configured to add N bits into the ID carried in the transmission request, where N is a positive integer equal to a sum of bits added by all interconnection structures in a longest loop of a system into the ID carried in the transmission request that passes through the interconnection structures;

a first interconnection structure, configured to add M bits into the ID carried in the transmission request output by the first extending module, where M is a positive integer equal to the number of bits added by the first interconnection structure into the ID carried in the transmission request that passes through the first interconnection structure;

a first subtracting module, configured to subtract M bits from the ID carried in the transmission request output by the first interconnection structure when a slave device to be accessed by the master device is not a slave device connected with the first interconnection structure;

a second interconnection structure, configured to extend the ID carried in the transmission request output by the first subtracting module, and output the extended transmission request until the transmission request is sent to the slave device to be accessed; and the slave device, configured to receive and process the transmission request output by the second interconnection structure or an interconnection structure next to the second interconnection structure in the direction of sending the transmission request.

A transmission method under AXI bus provided in an embodiment includes:

receiving a transmission request that carries an identifier (ID) indicating a serial number of a master device and sent by a master device; adding N bits into the ID carried in the transmission request, where N is a positive integer equal to a sum of bits added by all interconnection structures in a longest loop of a system into the ID carried in the transmission request that passes through the interconnection structures; and sending the transmission request that carries the ID added with N bits to a first interconnection structure;

adding, by the first interconnection structure, M bits into the ID carried in the received transmission request; and subtracting M bits from the ID carried in the transmission request output by the first interconnection structure when a slave device to be accessed by the master device is not a slave device connected with the first interconnection structure, where M is a positive integer equal to the number of bits added by the first interconnection structure into the ID carried in the transmission request that passes through the first interconnection structure; and sending the transmission request that carries the ID shortened by M bits to a second interconnection structure to access the slave device.

Another transmission method under AXI bus provided in an embodiment includes:

adding M bits into an ID carried in a transmission response output by a second interconnection structure when a slave device intends to access a master device connected with a first interconnection structure, where M is a positive integer equal to the number of bits added by the first interconnection structure into an ID carried in a corresponding transmission request that passes through the first interconnection structure; and sending the transmission response that carries the ID added with M bits to the first interconnection structure;

subtracting, by the first interconnection structure, M bits from the ID carried in the received transmission response; and subtracting N bits from the ID carried in the transmission response output by the first interconnection structure, where N is a positive integer equal to a sum of bits added by all interconnection structures in a longest loop of a system into the ID carried in the transmission request that passes through the interconnection structures; and sending the transmission response that carries the ID shortened by N bits to the master device.

In the embodiments, a certain number of bits are added into the ID carried in the transmission request output by the master device, and the number of added bits is equal to the sum of bits to be added into the ID after the transmission request passes through the whole loop; a certain number of bits are subtracted from the ID carried in the transmission request output by the first interconnection structure when the slave device to be accessed by the master device is not the slave device connected with the first interconnection structure, and the number of subtracted bits is the number of bits added by the first interconnection structure into the ID carried in the transmission request that passes through the first interconnection structure. In this way, the bit width of the ID remains unchanged after the transmission request passes through the first interconnection structure, the ID is matched in the loop without increasing costs or compressing the ID, the interconnection/loop is implemented between multiple on-chip bus structures (namely, interconnection structures), and the decrease of bus efficiency caused by the ID information loss is avoided.

BRIEF DESCRIPTION OF THE DRAWINGS

To make the technical clearer, the following drawings for illustrating the embodiments are provided. The drawings outlined below are not exhaustive, and persons of ordinary skill in the art can derive other drawings from such accompanying drawings without any creative effort.

FIG. 5a is a method flowchart according to a second embodiment;

FIG. 6 is a method flowchart according to a third embodiment;

DETAILED DESCRIPTION OF THE EMBODIMENTS

The following detailed description is given with reference to the accompanying drawings to provide a thorough understanding of the embodiments. The drawings and the detailed description are merely representative, and the disclosed embodiments are illustrative in nature and not exhaustive. All other embodiments, which can be derived by those skilled in the art from the embodiments given herein without any creative effort, shall fall within the scope of the claims.

Figure 1:
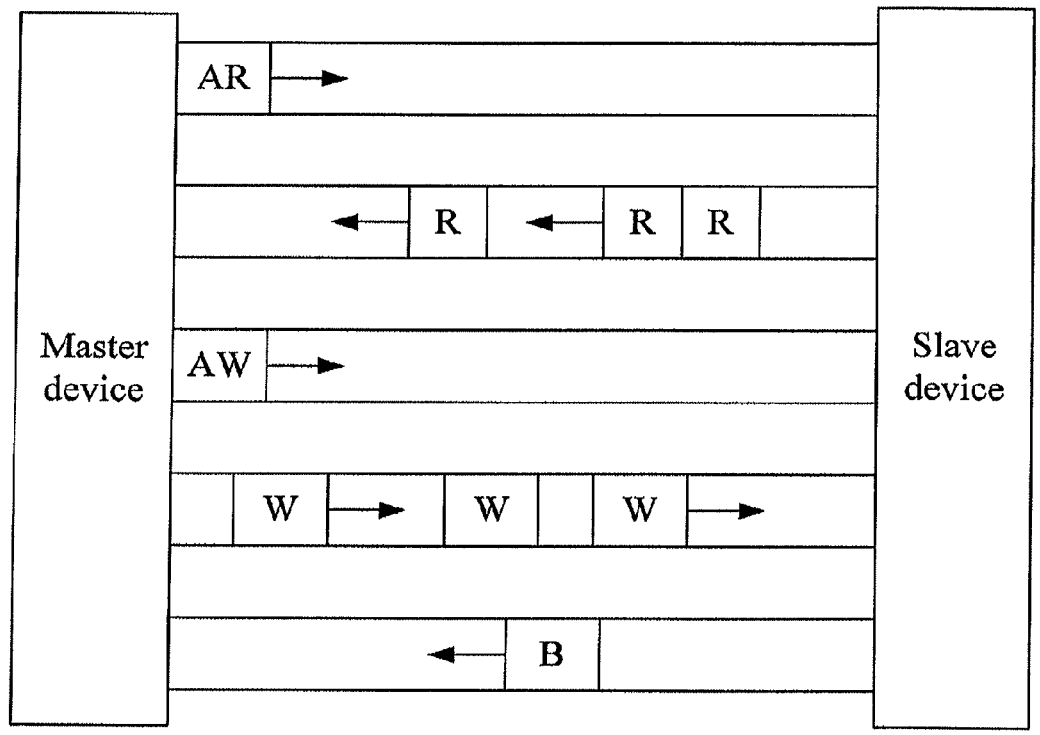
FIG. 1 shows AXI bus transmission in the prior art.
Figure 2:
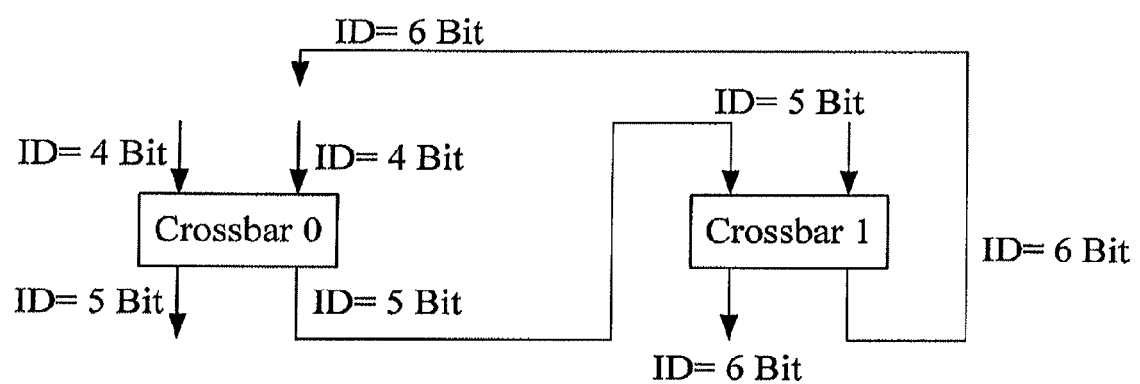
FIG. 2 shows ID mismatch in the prior art.
Figure 3:
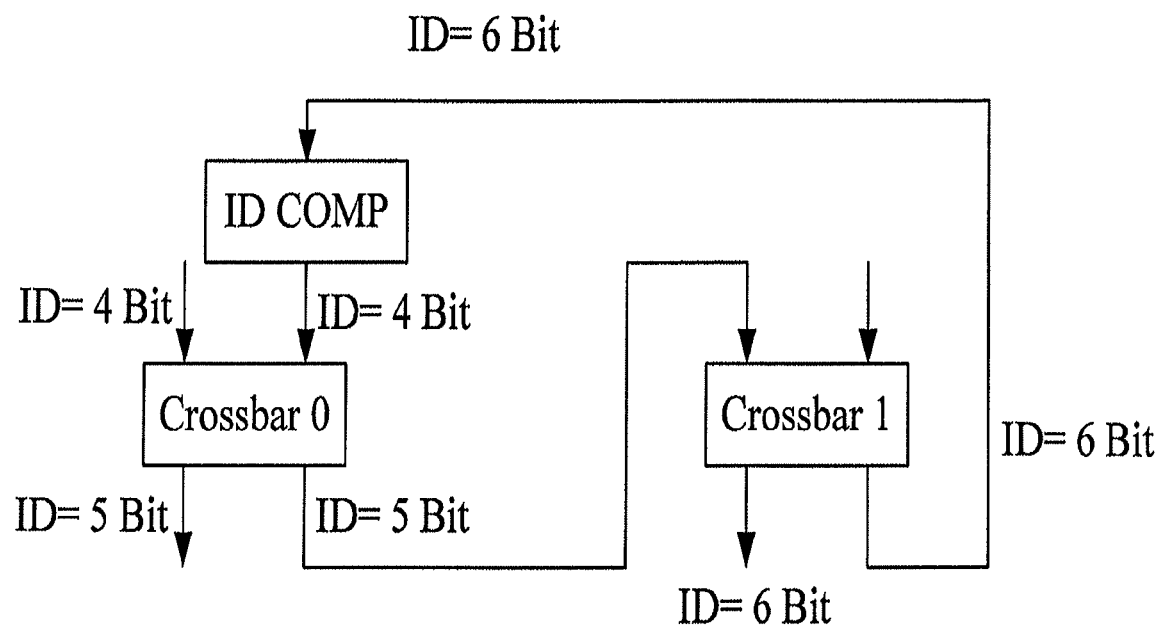
FIG. 3 shows a solution to ID mismatch in the prior art.
Figure 4:
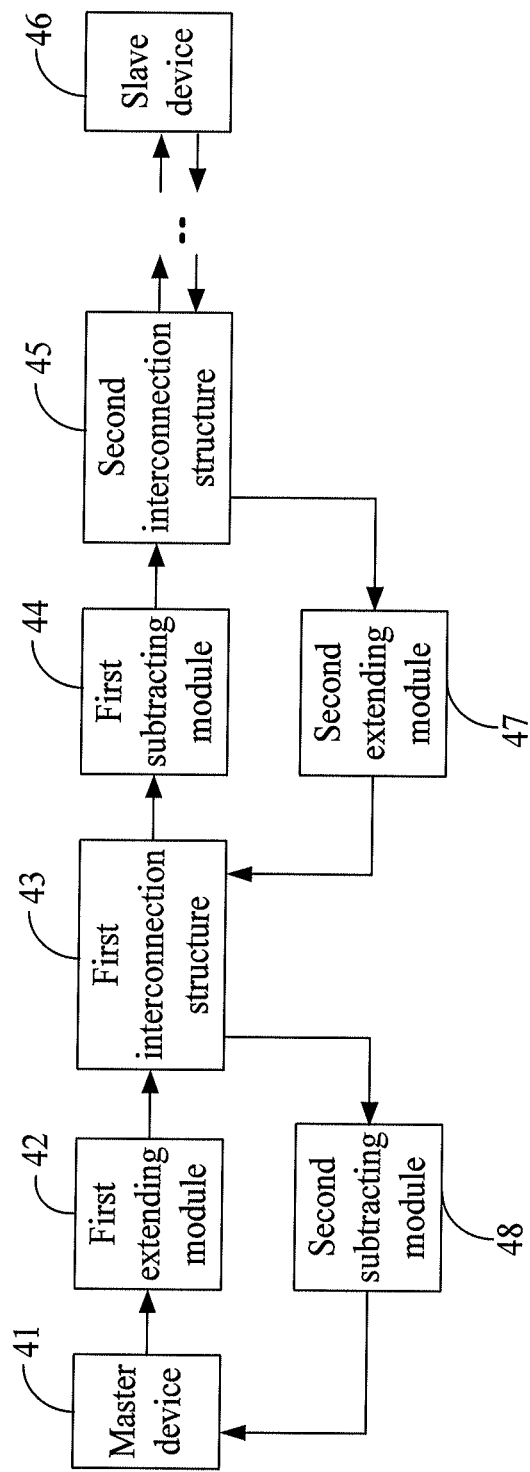
FIG. 4 shows a structure of a system on chip (soc) according to a first embodiment.

FIG. 4 shows a structure of a system on chip (soc) in the first embodiment. The system includes a master device 41, a first extending module 42, a first interconnection structure 43, a first subtracting module 44, a second interconnection structure 45, and a slave device 46. The interconnection structure here may be understood as an on-chip bus structure, especially an on-chip AXI bus structure.

The master device 41 is configured to send a transmission request that carries an ID indicating a serial number of the master device.

The first extending module 42 is configured to add N bits into the ID carried in the transmission request, where N is a positive integer equal to a sum of bits added by all interconnection structures in a longest loop of a system into the ID carried in the transmission request that passes through the interconnection structures.

The first interconnection structure 43 is configured to add M bits into the ID carried in the transmission request output by the first extending module, where M is a positive integer equal to the number of bits added by the first interconnection structure into the ID carried in the transmission request that passes through the first interconnection structure.

The first subtracting module 44 is configured to subtract M bits from the ID carried in the transmission request output by the first interconnection structure when a slave device to be accessed by the master device is not a slave device connected with the first interconnection structure.

The second interconnection structure 45 is configured to extend the ID carried in the transmission request output by the first subtracting module, and output the extended transmission request until the transmission request is sent to the slave device.

The slave device 46 is configured to receive and process the transmission request output by the second interconnection structure or an interconnection structure next to the second interconnection structure.

The foregoing modules correspond to the direction of sending the transmission request.

Corresponding to the direction of receiving the transmission response, the system may further include: a second extending module 47 and a second subtracting module 48; in this case, the slave device 46 is further configured to send a transmission response that carries an ID indicating the serial number of the master device and corresponding to the ID carried in the transmission request; the second interconnection structure 45 is further configured to subtract bits from the ID carried in the transmission response output by the slave device 46 or the interconnection structure next to the second interconnection structure 45; the second extending module 47 is configured to add M bits into the ID carried in the transmission response output by the second interconnection structure, where M is equal to the number of bits added by the first interconnection structure into the ID carried in the transmission request that passes through the first interconnection structure; the first interconnection structure 43 is further configured to subtract M bits from the ID carried in the transmission response output by the second extending module 47; the second subtracting module 48 is configured to subtract N bits from the ID carried in the transmission response output by the first interconnection structure 43, where N is equal to the sum of bits added by all interconnection structures in the longest loop of the system into the ID carried in the transmission request that passes through the interconnection structures; and the master device 41 is further configured to receive the transmission response output by the second subtracting module 48.

The number of master devices 41 may be more than one, and the number of slave devices 46 is at least one. Moreover, the system on chip (soc) in this embodiment may be located on a chip. In this embodiment, the master device connected with the first interconnection structure accesses the slave device connected with the second interconnection structure through the first interconnection structure and the second interconnection structure. Such a path of access between interconnection structures may be understood as a loop. When the system on chip (soc) includes only the first interconnection structure and the second interconnection structure, the interconnection structures that exist on the longest loop of the system are the first interconnection structure and the second interconnection structure.

Evidently, in this embodiment, a certain number of bits are added into the ID carried in the transmission request sent by the master device, and the number of added bits is equal to the sum of bits to be added into the ID carried in the transmission request after the transmission request passes through the whole loop; a certain number of bits are subtracted from the ID carried in the transmission request output by the first interconnection structure when the slave device to be accessed by the master device is not the slave device connected with the first interconnection structure, and the number of subtracted bits is the number of bits added by the first interconnection structure into the ID carried in the transmission request that passes through the first interconnection structure. In this way, the bit width of the ID remains unchanged after the transmission request passes through the first interconnection structure, the ID is matched in the loop without increasing costs or compressing the ID, the interconnection/loop is implemented between multiple on-chip bus structures, and the decrease of bus efficiency caused by the ID information loss is avoided.

Further, when the slave device intends to access the master device connected with the first interconnection structure, M bits are added into the ID carried in the transmission response output by the second interconnection structure, where M is equal to the number of bits added by the first interconnection structure into the ID carried in the corresponding transmission request that passes through the first interconnection structure (namely, a transmission response is returned, and M redundant bits are inserted back into the ID carried in the transmission response, and the positions and values of the inserted redundant bits are the same as those of the removed redundant bits); the transmission response that carries the ID added with M bits is sent to the first interconnection structure, and N bits are subtracted from the ID carried in the transmission response output by the first interconnection structure, where N is the sum of bits added by the interconnection structures in the longest loop of the system into the ID carried in the transmission request that passes through the interconnection structures; the transmission response that carries the ID shortened by N bits is sent to the master device, thus ensuring that the response data can be returned correctly.

FIG. 5a is a method flowchart in the second embodiment. This embodiment is applicable to a scenario where multiple master devices access a slave device. This scenario requires the ID for differentiating between master devices. Taking the sending of a transmission request as an example, as shown in FIG. 5a, the method in this embodiment includes the following steps:

Step 51: The first extending module receives a transmission request that carries an identifier (ID) indicating a serial number of a master device and sent by a master device; adds N bits into the ID carried in the transmission request, where N is a positive integer equal to a sum of bits added by all interconnection structures in a longest loop of a system into the ID carried in the transmission request that passes through the interconnection structures; and sends the transmission request that carries the ID added with N bits to a first interconnection structure.

The interconnection structure may be a crossbar, or a topology such as a Shared Bus.

Figure 5B:
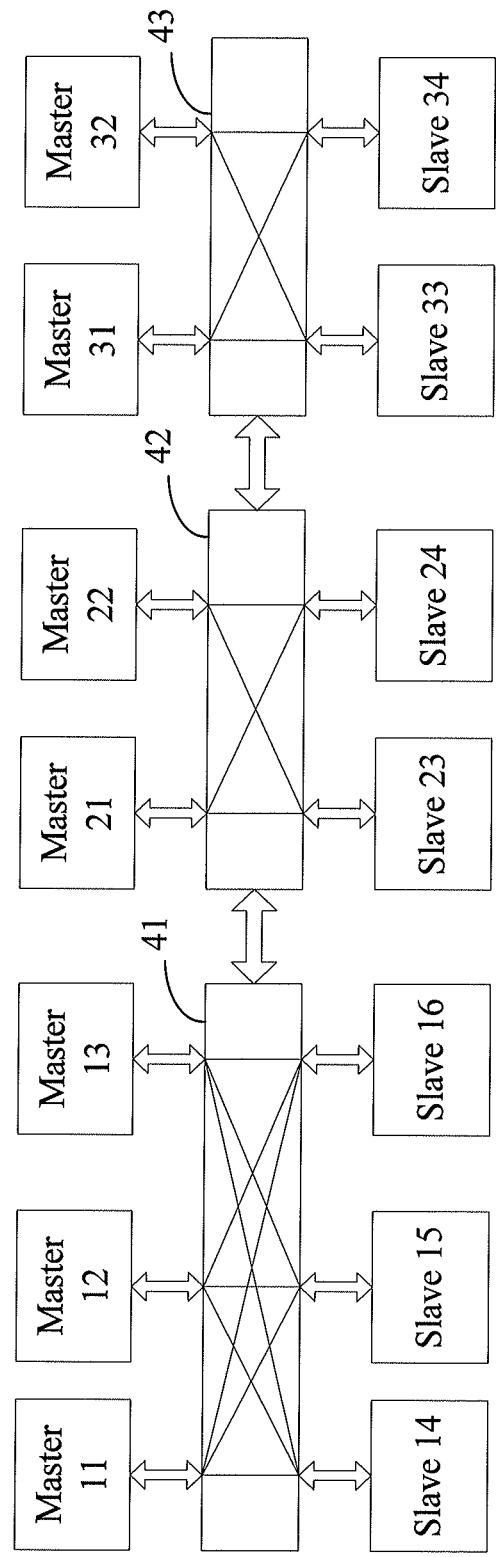
FIG. 5b shows a structure of a system on chip (soc) of a crossbar AXI bus structure according to an embodiment.

As shown in FIG. 5b, a system on chip (soc) that includes 7 master devices (master 11, master 12, master 13, master 21, master 22, master 31, and master 32) and 7 slave devices (slave 13, slave 14, slave 15, slave 23, slave 24, slave 33, and slave 34), the devices are interconnected through three crossbars (interconnection structure 41, interconnection structure 42, and interconnection structure 43). Mutual data access is implemented between the crossbars based on the solution in this embodiment. The figure does not illustrate the first extending module, the first subtracting module, the second extending module, and the second subtracting module.

The number (m) of bits added by each interconnection structure into the ID may be determined through $m=\log_2 M$ according to the number (M) of master devices connected with the interconnection structure. For example, if M is 2, 1 bit needs to be added into the ID; if M is 3 or 4, 2 bits need to be added; if M is 5-8, 3 bits need to be added. Therefore, the number of bits to be added in the whole loop is the sum of the bits added by all interconnection structures in the loop.

Step 52: The first subtracting module receives the transmission request output by the first interconnection structure and subtracts M bits from the ID carried in the transmission request output by the first interconnection structure when the slave device to be accessed by the master device is not the slave device connected with the first interconnection structure, where M is a positive integer equal to the number of bits added by the first interconnection structure into the ID carried in the transmission request that passes through the first interconnection structure; and sends the transmission request that carries the ID shortened by M bits to a second interconnection structure to access the slave device.

In this embodiment, in the direction of sending the transmission request, a certain number of bits are added into the ID carried in the transmission request output by the master device, and the number of added bits is equal to the sum of bits to be added into the ID after the transmission request passes through the whole loop; a certain number of bits are subtracted from the ID carried in the transmission request output by the first interconnection structure when the slave device to be accessed by the master device is not the slave device connected with the first interconnection structure, and the number of subtracted bits is the number of bits added by the first interconnection structure into the ID carried in the transmission request that passes through the first interconnection structure. In this way, the bit width of the ID remains unchanged after the transmission request passes through the first interconnection structure, the ID is matched in the loop without increasing costs or compressing the ID, the interconnection/loop is implemented between multiple on-chip bus structures (namely, interconnection structures), the decrease of bus efficiency caused by the ID information loss is avoided, and the bus efficiency is improved in the case that interconnection structures make up a loop.

FIG. 6 is a method flowchart in the third embodiment. This embodiment is applicable to a scenario where multiple master devices access a slave device. This scenario requires the ID for differentiating between master devices. Taking the sending of a transmission response as an example, as shown in FIG. 6, the method in this embodiment includes the following steps:

Step 61: The second extending module adds M bits into an ID carried in a transmission response sent by a second interconnection structure when a slave device intends to access a master device connected with a first interconnection structure, where M is a positive integer equal to the number of bits added by the first interconnection structure into the ID carried in the corresponding transmission request that passes through the first interconnection structure; and sends the transmission response that carries the ID added with M bits to the first interconnection structure.

The interconnection structure may be a topology such as a crossbar, or a Shared Bus.

In the direction of receiving the transmission response, the interconnection structure subtracts bits from the ID carried in the input transmission response. The number of subtracted bits is the same as the number of bits added by the interconnection structure into the ID carried in the input transmission request. The number can be determined according to the number (M) of master devices connected with the interconnection structure, namely: Number of bits added into the ID carried in the transmission request=Number of bits subtracted from the ID=$\log_2 M$.

Step 62: The second subtracting module subtracts N bits from the ID carried in the transmission response output by the first interconnection structure, where N is a positive integer equal to a sum of bits added by all interconnection structures in a longest loop of a system into the ID carried in the transmission request that passes through the interconnection structures; and sends the transmission response that carries the ID shortened by N bits to the master device.

The number (m) of bits added by each interconnection structure into the ID may be determined through $m = \log_2 M$ according to the number (M) of master devices connected with the interconnection structure. For example, if 2 master devices are connected with the interconnection structure, 1 bit needs to be added into the ID; if 3 or 4 master devices are connected with the interconnection structure, 2 bits need to be added; if 5-8 master devices are connected with the interconnection structure, 3 bits need to be added. The number of bits added in the whole loop is the sum of bits added by all interconnection structures in the loop.

Evidently, in the direction of receiving the transmission response, certain bits are subtracted from the ID to match the ID in the loop without increasing costs or compressing the ID, and improve the bus efficiency on the basis of forming a loop of the interconnection structures. Further, M bits are added into the ID carried in the transmission response output by the second interconnection structure, where M is equal to the number of bits added by the first interconnection structure into the ID carried in the corresponding transmission request that passes through the first interconnection structure (namely, a transmission response is returned, and M redundant bits are inserted back into the ID carried in the transmission response, and the positions and values of the inserted redundant bits are the same as those of the removed redundant bits); the transmission response that carries the ID added with M bits is sent to the first interconnection structure, and N bits are subtracted from the ID carried in the transmission response output by the first interconnection structure, where N is the sum of bits added by the interconnection structures in the longest loop of the system into the ID carried in the transmission request that passes through the interconnection structures; the transmission response that carries the ID shortened by N bits is sent to the master device, thus ensuring that the response data can be returned correctly.

Figure 7:
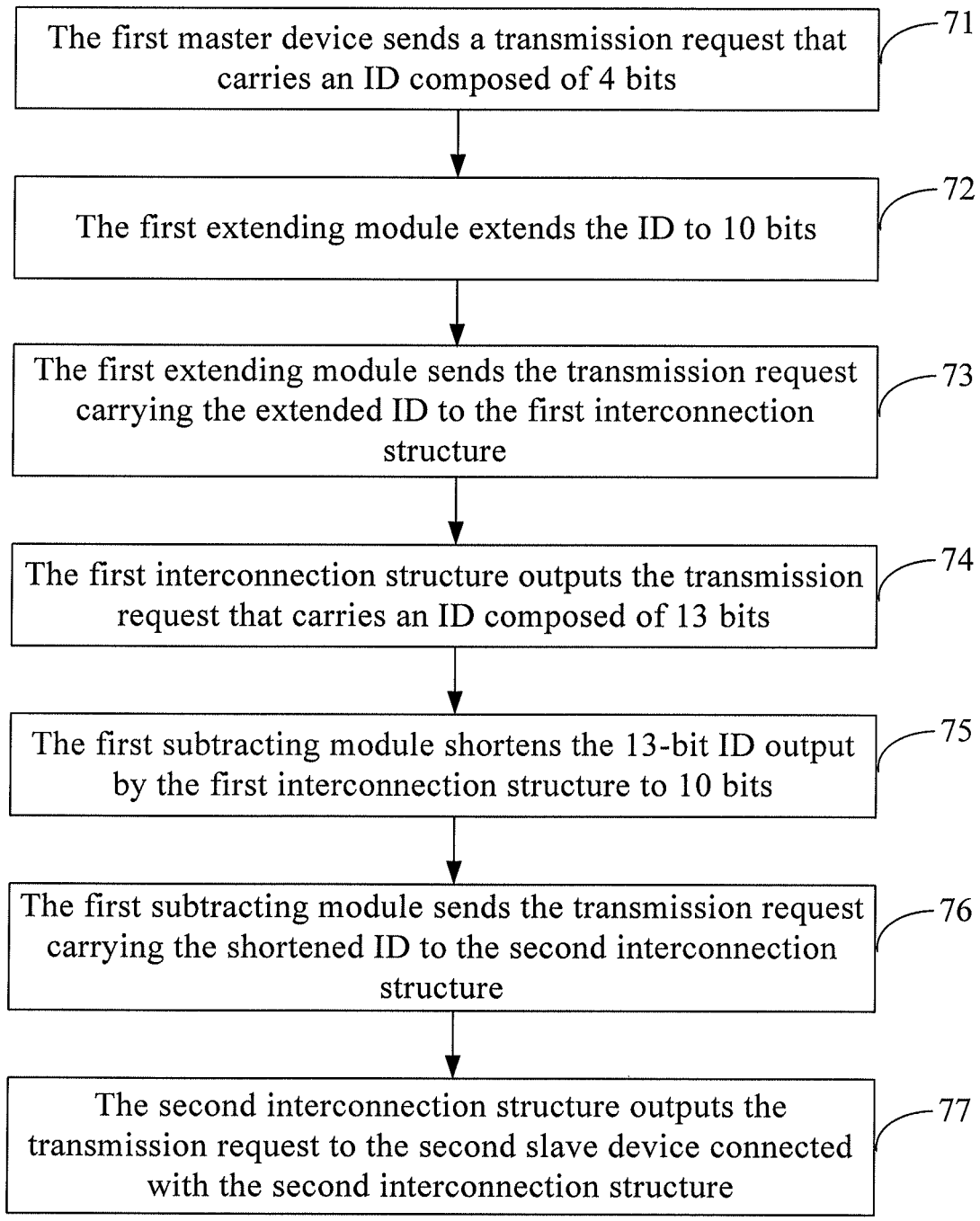
FIG. 7 is a method flowchart according to a fourth embodiment.
Figure 8:
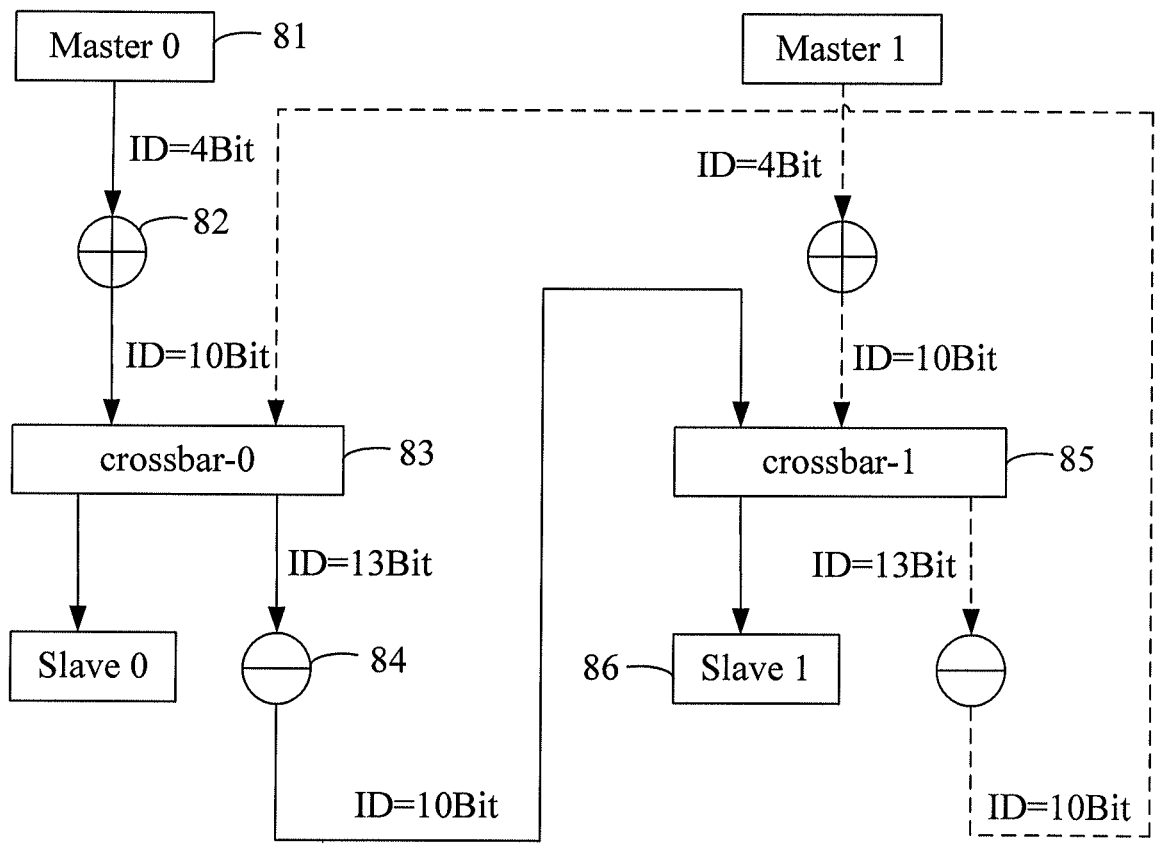
FIG. 8 shows a structure corresponding to the fourth embodiment.

FIG. 7 is a method flowchart in the fourth embodiment. FIG. 8 shows a structure corresponding to the fourth embodiment. It is assumed that two crossbars make up a loop, and that the master device sends a transmission request; and it is assumed that the bit width of the ID in the transmission request sent by every master device is 4 bits. If the bit width of the ID varies between the master devices, filler bits need to be added into the ID to unify the bit width beforehand. It is assumed that 3 bits are added into the ID carried in the transmission request every time the transmission request passes through a crossbar.

As shown in FIG. 7 and FIG. 8, the method in this embodiment includes the following steps:

Step 71: The first master device (master 0) 81 sends a transmission request that carries an ID composed of 4 bits.

Step 72: The first extending module 82 extends the ID to 10 bits.

After the transmission request passes through two crossbars, 6 bits need to be added into the ID carried in the transmission request in total. Therefore, the number (N) of bits to be added into the ID here is 6 to obtain 10 bit.

For example, 0s are inserted into lower bits of the ID. In this embodiment, six 0s are inserted in the lower bits of the ID. The filler bits are not limited to low bits and may be any bits of the ID. That is, the filler bits may be at any positions of the ID so long as the bits are identifiable). Accordingly, in the direction of receiving the transmission response, the corresponding filler bits need to be removed from the ID. The values of the filler bits are not limited to 0s and may be other eigenvalues of similar functions.

Step 73: The first extending module 82 sends the transmission request carrying the extended ID to the first interconnection structure (crossbar 0) 83.

Step 74: The first interconnection structure 83 outputs the transmission request that carries an ID composed of 13 bits.

After the transmission request passes through the first interconnection structure, 3 bits are added into the ID carried in the transmission request. Therefore, the first interconnection structure outputs an ID composed of 13 bits.

For example, three 0s are inserted into the lower bits of the ID.

Step 75: The first subtracting module 84 shortens the 13-bit ID output by the first interconnection structure 83 to 10 bits.

For example, 3 lower bits are subtracted from the ID.

Step 76: The first subtracting module 84 sends the transmission request carrying the shortened ID to the second interconnection structure (crossbar 1) 85.

Step 77: The second interconnection structure 85 outputs the transmission request to the second slave device (slave 1) 86 connected with the second interconnection structure.

After the transmission request passes through the second interconnection structure 85, 3 bits are added into the ID carried in the transmission request. Therefore, the second interconnection structure 85 outputs an ID composed of 13 bits.

The foregoing description deals with the method of sending from the first master device to the second slave device (indicated by the solid line in FIG. 8). The method of sending from the second master device (master 1) to the first slave device (slave 0) (indicated by the dotted line in FIG. 8) works in the same way.

In this embodiment, in the direction of sending the transmission request, a certain number of bits are added into the ID carried in the transmission request output by the master device, and the number of added bits is equal to the sum of bits to be added into the ID after the transmission request passes through the whole loop; a certain number of bits are subtracted from the ID carried in the transmission request output by the first interconnection structure when the slave device to be accessed by the master device is not the slave device connected with the first interconnection structure, and the number of subtracted bits is the number of bits added by the first interconnection structure into the ID carried in the transmission request that passes through the first interconnection structure. In this way, the bit width of the ID remains unchanged after the transmission request passes through the first interconnection structure, the ID is matched in the loop without increasing costs or compressing the ID, the interconnection/loop is implemented between multiple on-chip bus structures (namely, interconnection structures), and the decrease of bus efficiency caused by the ID information loss is avoided.

Figure 9:
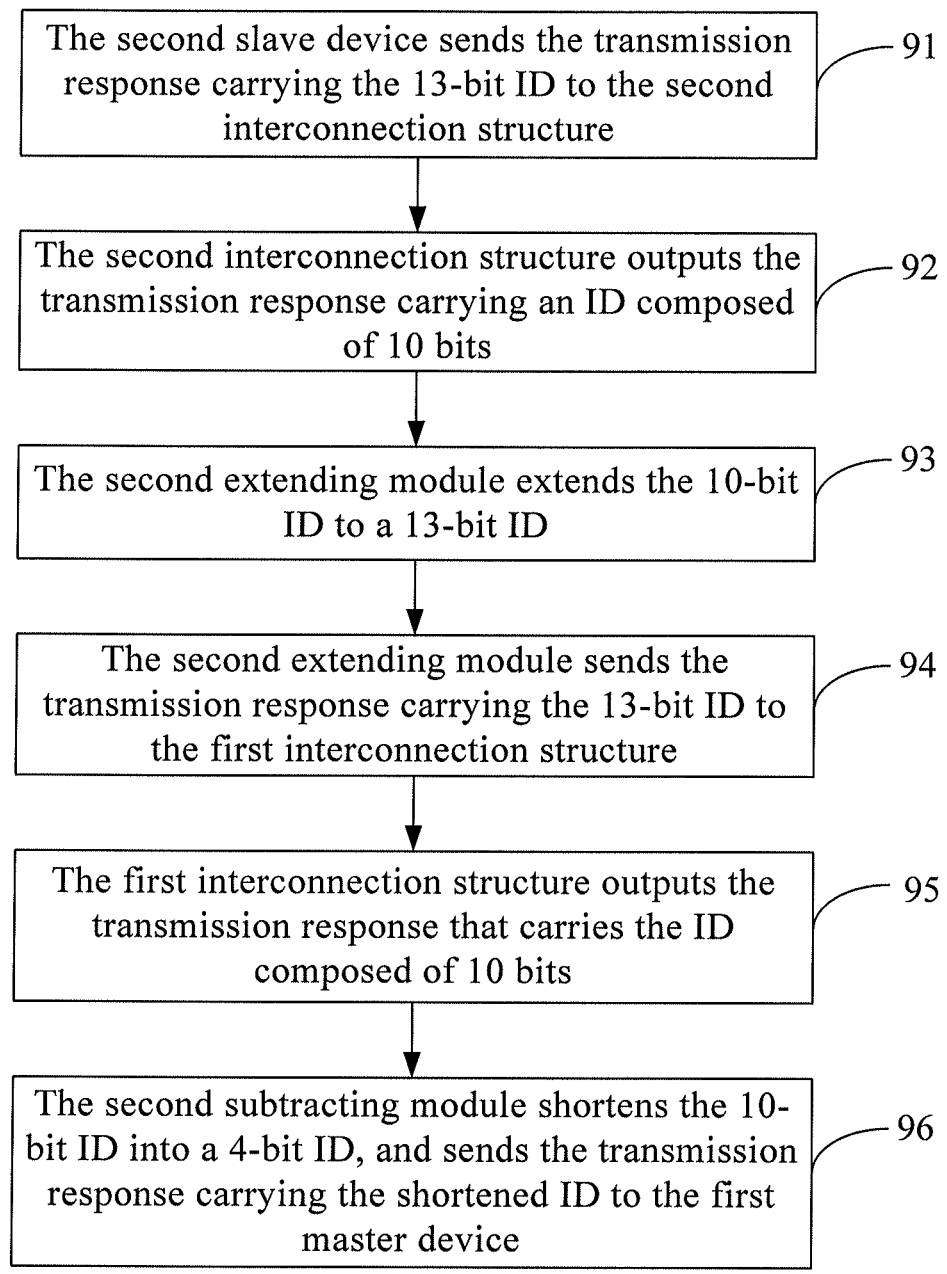
FIG. 9 is a method flowchart according to a fifth embodiment.
Figure 10:
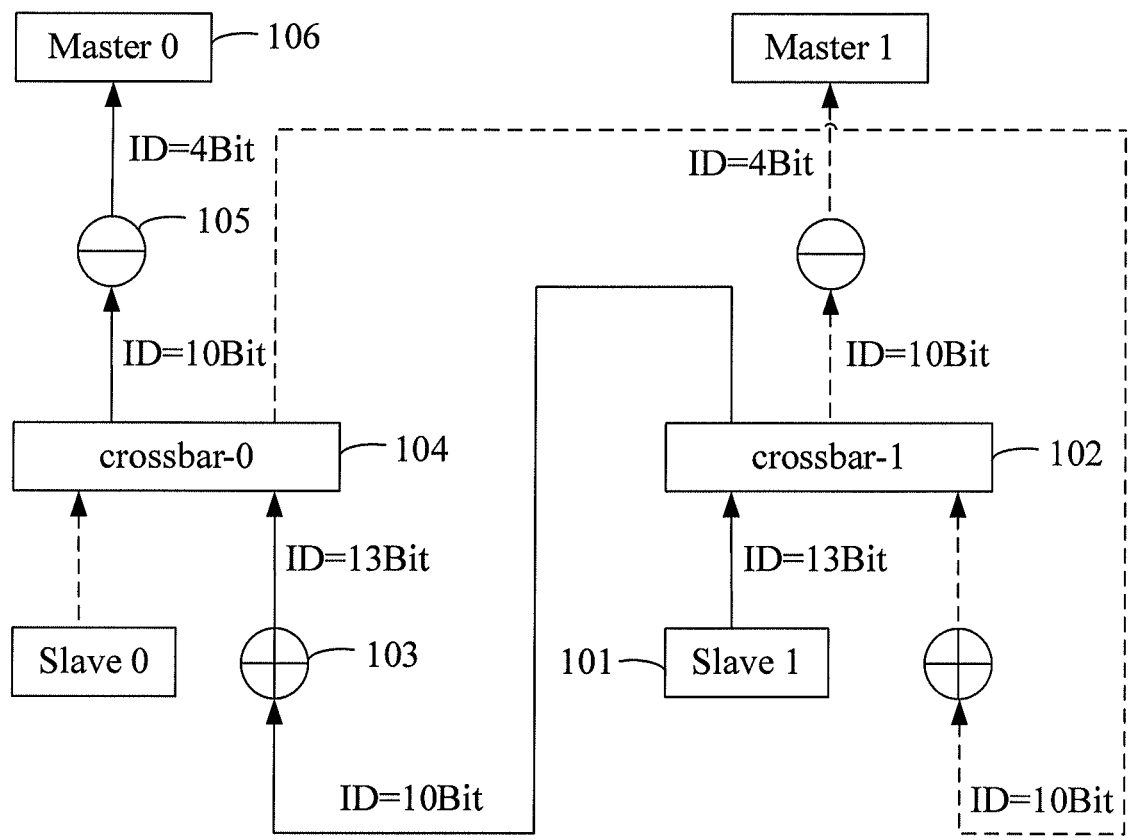
FIG. 10 shows a structure corresponding to the fifth embodiment.

FIG. 9 is a method flowchart in the fifth embodiment; and FIG. 10 shows a structure corresponding to the fifth embodiment. It is assumed that two crossbars make up a loop, and that the master device receives a transmission response; and it is assumed that the bit width of the ID in the transmission request sent by every slave device is 13 bits. If the bit width of the ID varies between the slave devices, filler bits need to be added into the ID to unify the bit width beforehand. It is assumed that 3 bits are subtracted from the ID carried in the transmission response every time the transmission response passes through a crossbar.

As shown in FIG. 9 and FIG. 10, the method in this embodiment includes the following steps:

Step 91: The second slave device (slave 1) 101 sends the transmission response carrying the 13-bit ID to the second interconnection structure (crossbar 1) 102.

Step 92: The second interconnection structure 102 outputs the transmission response carrying an ID composed of 10 bits.

After the transmission response passes through the second interconnection structure, 3 bits are subtracted from the ID carried in the transmission response. Therefore, the second interconnection structure outputs the transmission response carrying an ID composed of 10 bits.

For example, 3 lower bits are subtracted from the ID.

Step 93: The second extending module 103 extends the 10-bit ID to a 13-bit ID.

Step 94: The second extending module 103 sends the transmission response carrying the 13-bit ID to the first interconnection structure (crossbar 0) 104.

Step 95: The first interconnection structure 104 outputs the transmission response that carries the ID composed of 10 bits.

Step 96: The second subtracting module 105 shortens the 10-bit ID into a 4-bit ID, and sends the transmission response carrying the shortened ID to the first master device (master 0) 106.

After the transmission request passes through the foregoing two crossbars, 6 bits are added into the ID carried in the transmission request. Therefore, 6 bits need to be subtracted from the ID in the transmission response here, and the ID is shortened to 4 bits.

The foregoing description deals with the method of receiving from the second slave device to the first master device (indicated by the solid line in FIG. 10). The method of receiving from the first slave device (slave 0) to the second master device (master 1) (indicated by the dotted line in FIG. 10) works in the same way.

In this embodiment, in the direction of receiving the transmission response, a certain number of bits are subtracted from the ID carried in the transmission response output by the interconnection structure, where the number of subtracted bits is equal to the sum of bits added into the ID carried in the transmission request after the transmission request passes through the whole loop. Therefore, the ID is matched in the loop without increasing costs or compressing the ID. Further, M bits are added into the ID carried in the transmission response output by the second interconnection structure, where M is equal to the number of bits added by the first interconnection structure into the ID carried in the corresponding transmission request that passes through the first interconnection structure (namely, a transmission response is returned, and M redundant bits are inserted back into the ID carried in the transmission response, and the positions and values of the inserted redundant bits are the same as those of the removed redundant bits); the transmission response that carries the ID added with M bits is sent to the first interconnection structure, and N bits are subtracted from the ID carried in the transmission response output by the first interconnection structure, where N is the sum of bits added by the interconnection structures in the longest loop of the system into the ID carried in the transmission request that passes through the interconnection structures; the transmission response that carries the ID shortened by N bits is sent to the master device, thus ensuring that the response data can be returned correctly.

Figure 11A:
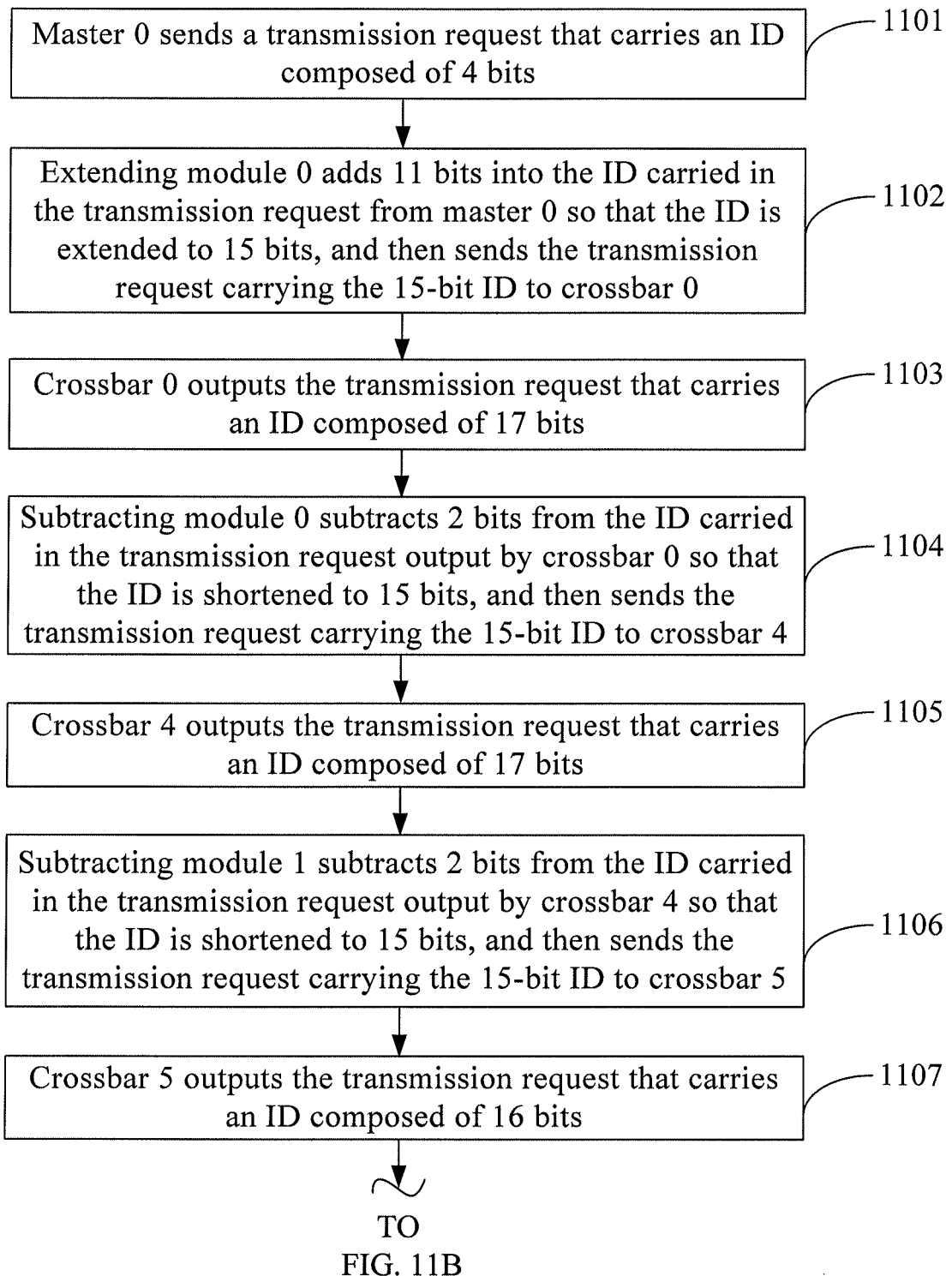
FIGS. 11A and 11B are a method flowchart according to a sixth embodiment.
Figure 11B:
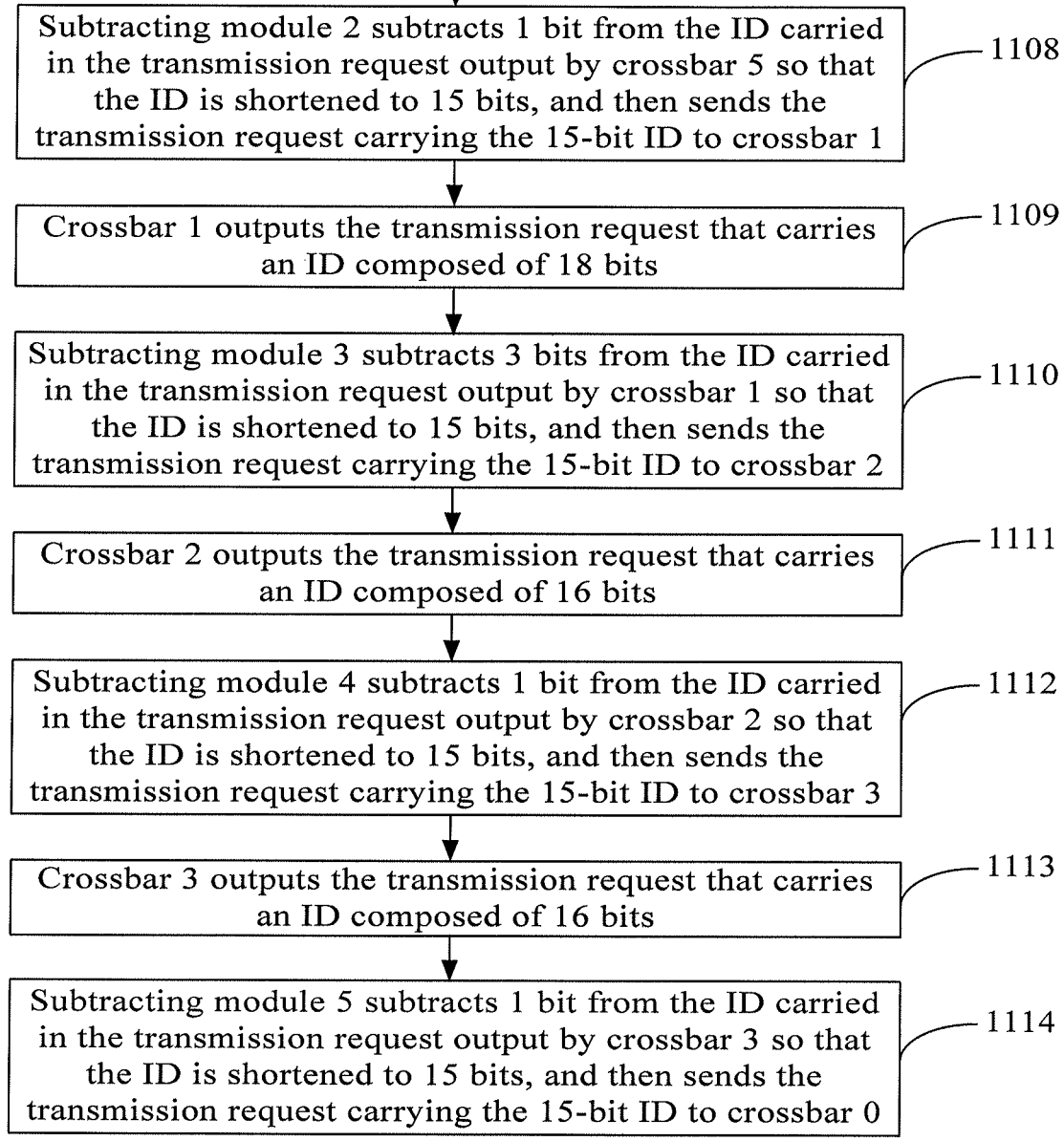
Figure 12:
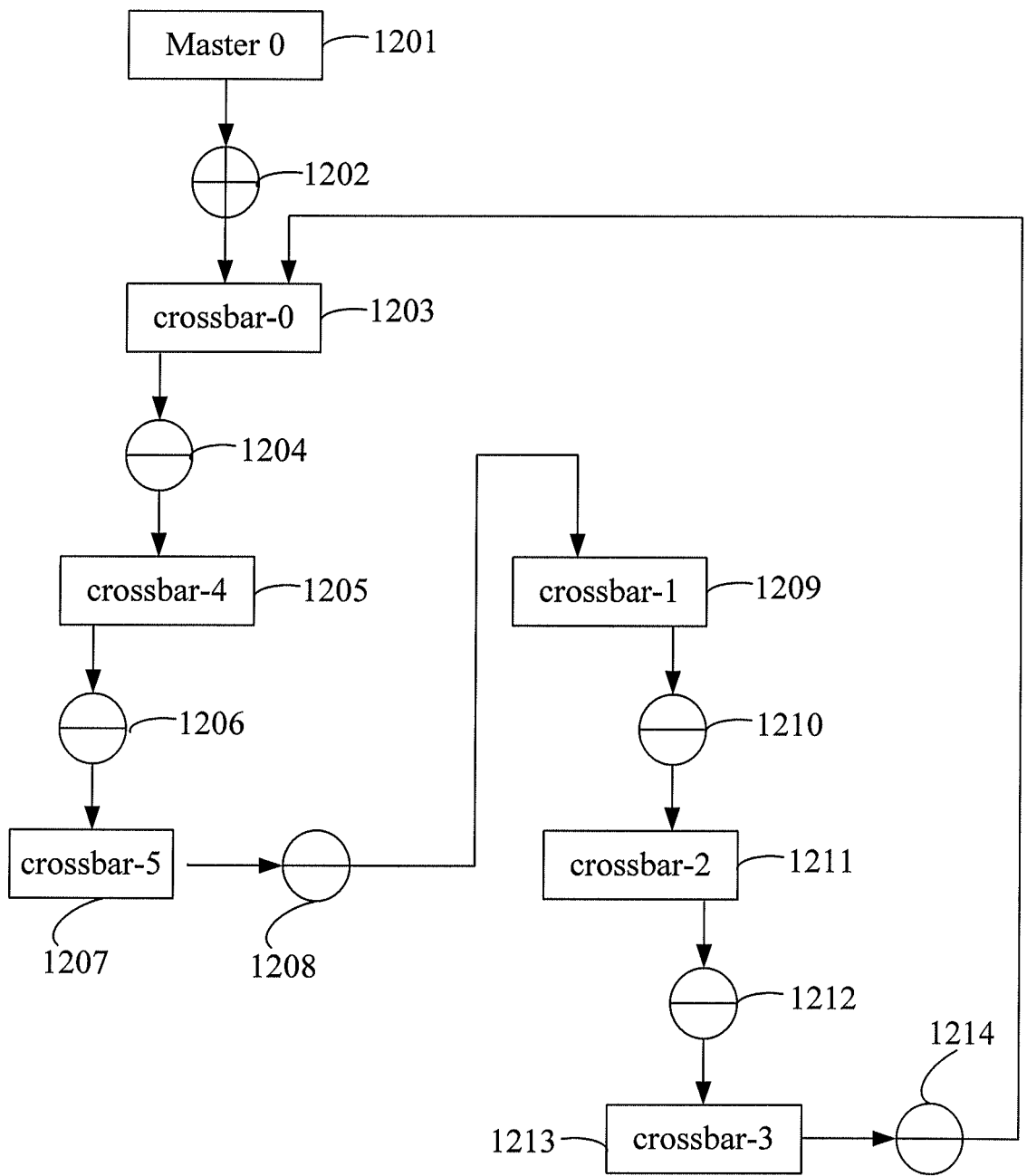
FIG. 12 shows a structure corresponding to the sixth embodiment.

FIG. 11A and FIG. 11B are a method flowchart in the sixth embodiment; and FIG. 12 shows a structure corresponding to the sixth embodiment.

As shown in FIG. 12, supposing that six crossbars form a tree structure, the system includes master 0 (1201), extending module 0 (1202), crossbar 0 (1203), subtracting module 0 (1204), crossbar 4 (1205), subtracting module 1 (1206), crossbar 5 (1207), subtracting module 2 (1208), crossbar 1 (1209), subtracting module 3 (1210), crossbar 2 (1211), subtracting module 4 (1212), crossbar 3 (1213), and subtracting module 5 (1214). The longest loop traverses all crossbars, namely, crossbar 0→crossbar 4→crossbar 5→crossbar 1→crossbar 2→crossbar 3→crossbar 0. Therefore, the extended ID needs to be calculated for the whole loop. Supposing that the bit width of the ID extended at crossbar 0, crossbar 1, crossbar 2, crossbar 3, crossbar 4, and crossbar 5 is 2, 3, 1, 1, 2, and 1 respectively, 11 bits need to be added into the ID in the longest loop. If the master device never travels in this way: its packet passes through the crossbar loop and returns to the initial crossbar and then enters the loop again, the longest loop is crossbar 4→crossbar 5→crossbar 1→crossbar 2→crossbar 3→crossbar 0. In this case 9 bits need to be added into the ID.

Supposing that 11 bits are added into the ID, as shown in FIG. 11A and FIG. 11B, the method in this embodiment includes the following steps:

Step 1101: Master 0 sends a transmission request that carries an ID composed of 4 bits.

Step 1102: Extending module 0 adds 11 bits into the ID carried in the transmission request from master 0 so that the ID is extended to 15 bits, and then sends the transmission request carrying the 15-bit ID to crossbar 0.

Step 1103: Crossbar 0 outputs the transmission request that carries an ID composed of 17 bits.

Step 1104: Subtracting module 0 subtracts 2 bits from the ID carried in the transmission request output by crossbar 0 so that the ID is shortened to 15 bits, and then sends the transmission request carrying the 15-bit ID to crossbar 4.

Step 1105: Crossbar 4 outputs the transmission request that carries an ID composed of 17 bits.

Step 1106: Subtracting module 1 subtracts 2 bits from the ID carried in the transmission request output by crossbar 4 so that the ID is shortened to 15 bits, and then sends the transmission request carrying the 15-bit ID to crossbar 5.

Step 1107: Crossbar 5 outputs the transmission request that carries an ID composed of 16 bits.

Step 1108: Subtracting module 2 subtracts 1 bit from the ID carried in the transmission request output by crossbar 5 so that the ID is shortened to 15 bits, and then sends the transmission request carrying the 15-bit ID to crossbar 1.

Step 1109: Crossbar 1 outputs the transmission request that carries an ID composed of 18 bits.

Step 1110: Subtracting module 3 subtracts 3 bits from the ID carried in the transmission request output by crossbar 1 so that the ID is shortened to 15 bits, and then sends the transmission request carrying the 15-bit ID to crossbar 2.

Step 1111: Crossbar 2 outputs the transmission request that carries an ID composed of 16 bits.

Step 1112: Subtracting module 4 subtracts 1 bit from the ID carried in the transmission request output by crossbar 2 so that the ID is shortened to 15 bits, and then sends the transmission request carrying the 15-bit ID to crossbar 3.

Step 1113: Crossbar 3 outputs the transmission request that carries an ID composed of 16 bits.

Step 1114: Subtracting module 5 subtracts 1 bit from the ID carried in the transmission request output by crossbar 3 so that the ID is shortened to 15 bits, and then sends the transmission request carrying the 15-bit ID to crossbar 0.

This embodiment takes the direction of sending the transmission request as an example. The direction of receiving the transmission response works in the same way.

Although the foregoing embodiment takes the crossbar as an example, the principles are also applicable to the topology such as a Shared Bus.

In the embodiments, in the direction of sending the transmission request, a certain number of bits are added into the ID carried in the transmission request output by the master device, and the number of added bits is equal to the sum of bits to be added into the ID after the transmission request passes through the whole loop; a certain number of bits are subtracted from the ID carried in the transmission request output by the first interconnection structure when the slave device to be accessed by the master device is not the slave device connected with the first interconnection structure, and the number of subtracted bits is the number of bits added by the first interconnection structure into the ID carried in the transmission request that passes through the first interconnection structure. In this way, the bit width of the ID remains unchanged after the transmission request passes through the first interconnection structure, the ID is matched in the loop without increasing costs or compressing the ID, the interconnection/loop is implemented between multiple on-chip bus structures (namely, interconnection structures), and the decrease of bus efficiency caused by the ID information loss is avoided.

Persons of ordinary skill in the art should understand that all or part of the steps of the method according to the embodiments may be implemented by a program instructing relevant hardware. The program may be stored in a computer readable storage medium. When the program runs, the steps of the method according to the embodiments are performed. The storage medium may be any medium that is capable of storing program codes, such as a Read Only Memory (ROM), a Random Access Memory (RAM), a magnetic disk, or a Compact Disk-Read Only Memory (CD-ROM).

Finally, it should be noted that the above embodiments are merely provided for describing the technical solution, but not intended to limit the scope of the claims. It is apparent that persons skilled in the art can make various modifications and variations to the embodiments without departing from the spirit and scope of the claims. The claims are intended to cover such the modifications and variations and their equivalents.

What is claimed is:

1. A system on chip, comprising:
a master device, configured to send a transmission request that carries an identifier (ID) indicating a serial number of the master device;
a first extending module, configured to add N bits into the ID carried in the transmission request, wherein N varies according to interconnection structures that the transmission request passes through and is a positive integer equal to a sum of bits added by all interconnection structures in a longest loop of the system into the ID carried in the transmission request;
a first interconnection structure, configured to add M bits into the ID carried in the transmission request output by the first extending module, wherein M is a positive integer equal to a number of bits added by the first interconnection structure into the ID carried in the transmission request that passes through the first interconnection structure;
a first subtracting module, configured to subtract M bits from the ID carried in the transmission request output by the first interconnection structure when a slave device to be accessed by the master device is not a slave device connected with the first interconnection structure;

a second interconnection structure, configured to extend the ID carried in the transmission request output by the first subtracting module, and output an extended transmission request until the transmission request is sent to the slave device to be accessed; and wherein the slave device is configured to receive and process the transmission request output by the second interconnection structure or an interconnection structure next to the second interconnection structure in a direction of sending the transmission request.

2. The system according to claim 1, wherein:

the system further comprises a second extending module and a second subtracting module;

the slave device is further configured to send a transmission response that carries an ID indicating the serial number of the master device and corresponding to the ID carried in the transmission request;

the second interconnection structure is further configured to subtract bits from the ID carried in the transmission response output by the slave device or the interconnection structure previous to the second interconnection structure in a direction of receiving the transmission response;

the second extending module is configured to add M bits into the ID carried in the transmission response output by the second interconnection structure, wherein M is equal to a number of bits added by the first interconnection structure into the ID carried in the transmission request that passes through the first interconnection structure;

the first interconnection structure is further configured to subtract M bits from the ID carried in the transmission response output by the second extending module;

the second subtracting module is configured to subtract N bits from the ID carried in the transmission response output by the first interconnection structure, wherein N is equal to the sum of bits added by all interconnection structures in the longest loop of the system into the ID carried in the transmission request that passes through the interconnection structures; and the master device is further configured to receive the transmission response output by the second subtracting module.

3. The system according to claim 1, wherein:

the first extending module is configured to insert N 0s into lower bits of the ID carried in the transmission request; and the first subtracting module is configured to subtract M lower bits from the ID carried in the transmission request.

4. The system according to claim 2, wherein:

the second extending module is configured to insert M 0s into lower bits of the ID carried in the transmission response; and the second subtracting module is configured to subtract N lower bits from the ID carried in the transmission response.

5. A transmission method under Advanced eXtensible Interface (AXI) bus, comprising:

receiving a transmission request that carries an identifier (ID) indicating a serial number of a master device and sent by the master device; adding N bits into the identifier (ID) carried in the transmission request, wherein N varies according to interconnection structures that the transmission request passes through and is a positive integer equal to a sum of bits added by all interconnection structures in a longest loop of a system into the ID carried in the transmission request;

sending the transmission request that carries the ID added with N bits to a first interconnection structure;

adding, by the first interconnection structure, M bits into the ID carried in the received transmission request; and subtracting M bits from the ID carried in the transmission request output by the first interconnection structure when a slave device to be accessed by the master device is not a slave device connected with the first interconnection structure, wherein M is a positive integer equal to a number of bits added by the first interconnection structure into the ID carried in the transmission request that passes through the first interconnection structure; and sending the transmission request that carries the ID shortened by M bits to a second interconnection structure to access the slave device.

6. The method according to claim 5, further comprising:

when the slave device to be accessed by the master device is the slave device connected with the first interconnection structure, outputting, by the first interconnection structure, the transmission request that carries the ID added with M bits to the slave device connected with the first interconnection structure.

7. The method according to claim 5, wherein:

adding N bits into the identifier (ID) carried in the transmission request, comprises:

inserting N 0s into lower bits of the ID carried in the transmission request; and wherein subtracting M bits from the ID carried in the transmission request output by the first interconnection structure comprises:

subtracting M lower bits from the ID carried in the transmission request.

8. The method according to claim 6, wherein:

adding N bits into the identifier (ID) carried in the transmission request, comprises:

inserting N 0s into lower bits of the ID carried in the transmission request; and wherein subtracting M bits from the ID carried in the transmission request output by the first interconnection structure comprises:

subtracting M lower bits from the ID carried in the transmission request.

9. A transmission method under Advanced eXtensible Interface (AXI) bus, comprising:

adding M bits into an identifier (ID) carried in a transmission response output by a second interconnection structure when a slave device intends to access a master device connected with a first interconnection structure, wherein M is a positive integer equal to a number of bits added by the first interconnection structure into an ID carried in a corresponding transmission request that passes through the first interconnection structure; and sending the transmission response that carries the ID added with M bits to the first interconnection structure;

subtracting, by the first interconnection structure, M bits from the ID carried in a received transmission response; and subtracting N bits from the ID carried in the transmission response output by the first interconnection structure, wherein N varies according to interconnection structures that the transmission request passes through and is a positive integer equal to a sum of bits added by all interconnection structures in a longest loop of a system into the ID carried in the transmission request; and sending the transmission response that carries the ID shortened by N bits to the master device.

10. The method according to claim 9, further comprising:
subtracting N bits from the ID carried in the transmission response output by the second interconnection structure when the slave device intends to access a master device connected with the second interconnection structure, wherein N is equal to a sum of bits added by all interconnection structures in the longest loop of the system into the ID carried in the transmission request that passes through the interconnection structures; and
sending the transmission response that carries the ID shortened by N bits to the master device connected with the second interconnection structure.

11. The method according to claim 9, wherein:
adding M bits into the ID carried in the transmission response output by the second interconnection structure comprises:
inserting M 0s into lower bits of the ID carried in the transmission response; and
wherein subtracting N bits from the ID carried in the transmission response output by the first interconnection structure comprises:
subtracting N lower bits from the ID carried in the transmission response.

12. The method according to claim 10, wherein:
adding M bits into the ID carried in the transmission response output by the second interconnection structure comprises:
inserting M 0s into lower bits of the ID carried in the transmission response; and
wherein subtracting N bits from the ID carried in the transmission response output by the first interconnection structure comprises:
subtracting N lower bits from the ID carried in the transmission response.

13. A non-transitory computer-readable medium having computer executable instructions for performing a transmission method under Advanced eXtensible Interface (AXI) bus comprising:
receiving a transmission request that carries an identifier (ID) indicating a serial number of a master device and sent by the master device; adding N bits into the identifier (ID) carried in the transmission request, wherein N varies according to interconnection structures that the transmission request passes through and is a positive integer equal to a sum of bits added by all interconnection structures in a longest loop of a system into the ID carried in the transmission request;
sending the transmission request that carries the ID added with N bits to a first interconnection structure;
subtracting M bits from the ID carried in the transmission request output by the first interconnection structure when a slave device to be accessed by the master device is not a slave device connected with the first interconnection structure, wherein M is a positive integer equal to a number of bits added by the first interconnection structure into the ID carried in the transmission request that passes through the first interconnection structure; and
sending the transmission request that carries the ID shortened by M bits to a second interconnection structure to access the slave device.

14. A non-transitory computer-readable medium having computer executable instructions for performing a transmission method under Advanced eXtensible Interface (AXI) bus comprising:
adding M bits into an identifier (ID) carried in a transmission response output by a second interconnection structure when a slave device intends to access a master device connected with a first interconnection structure, wherein M is a positive integer equal to a number of bits added by the first interconnection structure into an ID carried in a corresponding transmission request that passes through the first interconnection structure;
sending the transmission response that carries the ID added with M bits to the first interconnection structure;
subtracting N bits from the ID carried in the transmission response output by the first interconnection structure, wherein N is a positive integer equal to a sum of bits added by all interconnection structures in a longest loop of a system into the ID carried in the transmission request that passes through the interconnection structures; and
sending the transmission response that carries the ID shortened by N bits to the master device.

* * * * *